(12) United States Patent  
Ross

(10) Patent No.: US 9,291,810 B1  
(45) Date of Patent: Mar. 22, 2016

(54) VARIABLE MAGNIFICATION INDICATOR IN SIGHTING SYSTEM

(71) Applicant: RAYTHEON CANADA LIMITED, Ottawa (CA)

(72) Inventor: Brien D. Ross, Wyevale (CA)

(73) Assignee: RAYTHEON CANADA LIMITED, Ottawa (CA)

( * ) Notice: Subject to any disclaimer, the term of this patent is extended or adjusted under 35 U.S.C. 154(b) by 0 days.

(21) Appl. No.: 14/521,072

(22) Filed: Oct. 22, 2014

(51) Int. Cl.
*G02B 23/00* (2006.01)

(52) U.S. Cl.
CPC .................. *G02B 23/145* (2013.01)

(58) Field of Classification Search
CPC .................................................. G02B 23/145
USPC ................. 359/422, 432, 694, 699–701
See application file for complete search history.

(56) References Cited

U.S. PATENT DOCUMENTS

| | | | |
|---|---|---|---|
| 4,497,548 A | 2/1985 | Burris | |
| 5,181,323 A * | 1/1993 | Cooper | F41G 1/467 359/422 |
| 6,005,711 A * | 12/1999 | Mai | G02B 7/10 359/399 |
| 6,591,537 B2 * | 7/2003 | Smith | F41G 1/38 42/122 |
| 7,185,455 B2 * | 3/2007 | Zaderey | F41G 1/38 42/122 |
| 7,603,804 B2 * | 10/2009 | Zaderey | F41G 1/38 42/119 |
| 8,705,173 B2 * | 4/2014 | Peters | G02B 23/105 359/428 |
| 8,833,655 B2 * | 9/2014 | McCarty | F41G 3/08 235/400 |
| 2012/0314283 A1 * | 12/2012 | Jahromi | F41G 1/38 359/422 |
| 2013/0033746 A1 * | 2/2013 | Brumfield | G02B 23/105 359/401 |
| 2013/0170027 A1 | 7/2013 | Peters et al. | |

FOREIGN PATENT DOCUMENTS

GB 984410 A 2/1965

* cited by examiner

*Primary Examiner* — Frank Font  
(74) *Attorney, Agent, or Firm* — Lando & Anastasi, LLP

(57) ABSTRACT

A magnification zoom sighting system is disclosed. One embodiment includes an objective lens group that produces an image of a distant object at a first focal plane, a zoom lens element that relays the image from the first focal plane to a second focal plane and varies an optical magnification of the image, an ocular lens group for viewing the image at the second focal plane, a magnification adjustment mechanism coupled to the zoom lens element for adjusting an optical magnification setting of the zoom lens element to adjust the optical magnification of the image, and a reticle having magnification indicia, disposed proximate the first focal plane and such that it is configured to be viewable through the ocular lens group in a field of view thereof and superimposed upon the image. The magnification indicia conveys the optical magnification setting of the zoom lens element.

13 Claims, 5 Drawing Sheets

VARIABLE MAGNIFICATION INDICATOR IN SIGHTING SYSTEM

BACKGROUND

The layout of a conventional sighting zoom is illustrated in FIG. 1. Optical devices, such as the sighting zoom shown in FIG. 1, are often used to aid the aiming of weapons, such as rifles, pistols, bows, etc. Typically, a sighting zoom includes an objective 102 which focuses the target on a first image plane 104. The image on the first image plane 104 is then magnified and relayed to the second image plane 110 through the zoom 106. The eyepiece 108 relays that image from the second image plane 110 to the eye of the operator.

Conventional sighting zooms typically include a reticle, which can include cross-hairs or any other shape suited to assist the operator in aiming the associated weapon. An aiming reticle can be introduced into the system at either the first image plane 104 or second image plane 110, such that it remains in focus to the eye when viewing the target. If the reticle is introduced in the second image plane 110, the target changes in size during zooming; however, the aiming reticle does not vary in size. This limits the amount of useful information that can be provided to the user by the aiming reticle.

In contrast, a sighting zoom with a reticle positioned at the first image plane 104 has very different characteristics. If the aiming reticle is introduced in the first image plane 104, the aiming reticle will scale in size with the target while varying the magnification of the sighting zoom. A sighting zoom according to this arrangement enables detailed aiming measurements with the aiming reticle in addition to allowing the user to use detailed grid patterns on the aiming reticle to estimate size of the target, correct for ballistic drop, and compensate for cross winds.

Conventional sighting zooms allow adjustment of the magnification of the sighting zoom through a marked power ring on the exterior of the scope. The operator manually adjusts the magnification of the scope through rotation of the power ring. This requires the operator to remove his or her eye from its position on the scope in order to select the appropriate magnification, thereby disengaging visual contact with the target.

SUMMARY OF INVENTION

The present invention generally relates to direct view optical sighting devices and more particularly to reticles for optical sighting devices. Aspects and embodiments are directed to devices and methods for optical direct view sighting systems that use a variable magnification indicator. In particular, a reticle having magnification indicia informs an operator of the magnification setting of the sighting system without the need to disengage from a target.

In one embodiment, the magnification zoom sighting system includes an objective lens group that produces an image of a distant object at a first focal plane, a zoom lens element that relays the image from the first focal plane to a second focal plane and varies an optical magnification of the image, an ocular lens group for viewing the image at the second focal plane, a magnification adjustment mechanism coupled to the zoom lens element for adjusting an optical magnification setting of the zoom lens element to adjust the optical magnification of the image, and a reticle having magnification indicia, disposed proximate the first focal plane and such that it is configured to be viewable through the ocular lens group in a field of view thereof and superimposed upon the image. The magnification indicia conveys the optical magnification setting of the zoom lens element.

In some embodiments, the magnification zoom sighting system includes an elongated tube having an ocular end and a distal objective end, an objective lens group mounted at the objective end of the elongated tube that produces an image of a distant object, an ocular lens group having an eyepiece mounted at the ocular end of the elongated tube for viewing the image within the field of view thereof, a zoom lens element including a magnification adjustment mechanism having an optical magnification setting for adjusting optical magnification of the image, interposed between the objective lens group and the ocular lens group, and a reticle having magnification indicia that conveys the optical magnification setting, interposed between the objective lens group and the zoom lens element.

In a further embodiment, the magnification system includes an objective lens group that produces an image of a distant object at a first focal plane, a zoom lens element that relays the image from the first focal plane to a second focal plane and varies an optical magnification of the image, an ocular lens group for viewing the image at the second focal plane, a magnification adjustment mechanism coupled to the zoom lens element for adjusting an optical magnification setting of the zoom lens element to adjust the optical magnification of the image, and means for displaying magnification indicia proximate the first focal plane and such that it is viewable through the ocular lens group in a field of view thereof and superimposed upon the image, the magnification indicia conveying the optical magnification setting of the zoom group lens.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to devices and methods for magnification zoom sighting systems that use a reticle having magnification indicia. The magnification indicia informs an operator of the magnification setting without the need to visually disengage from a target.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
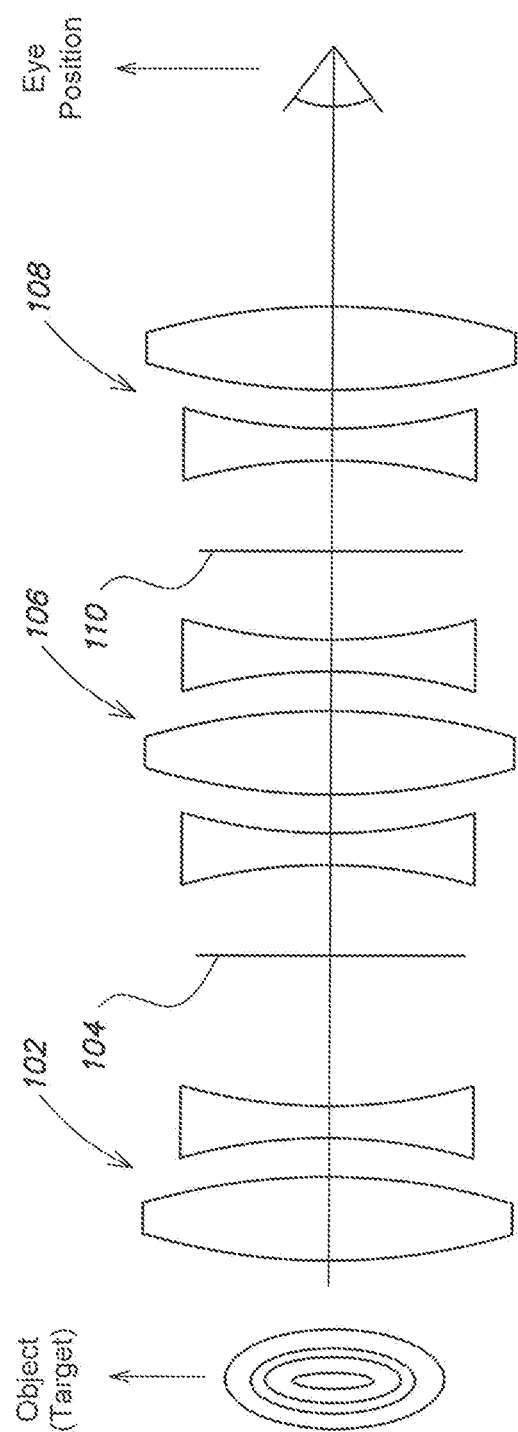
FIG. 1 is a layout diagram of one example of a typical sighting zoom.

Referring to FIG. 1 there is illustrated an example layout of a magnification zoom sighting system. The optical sighting system includes a plurality of lens groups enclosed in a scope housing. An objective lens group 102 is directed towards an object (otherwise referred to herein as target) to be sighted. The objective lens group 102 focuses an image of the target on a first image plane 104. At the first image plane the image is inverted, i.e., in an opposite arrangement. A zoom lens group 106 is placed after the objective lens group 106 to reorient and magnify the image in a second image plane 110. The zoom lens group 106 reorients the image such that the image corresponds to the target, i.e., top and bottom of the image are exactly as the eye perceives the top and bottom of the target. The ocular lens group 108 includes an eyepiece and enables viewing of the image at the second image plane 110 by the operator, who is positioned at a distance behind the eyepiece.

Figure 2:
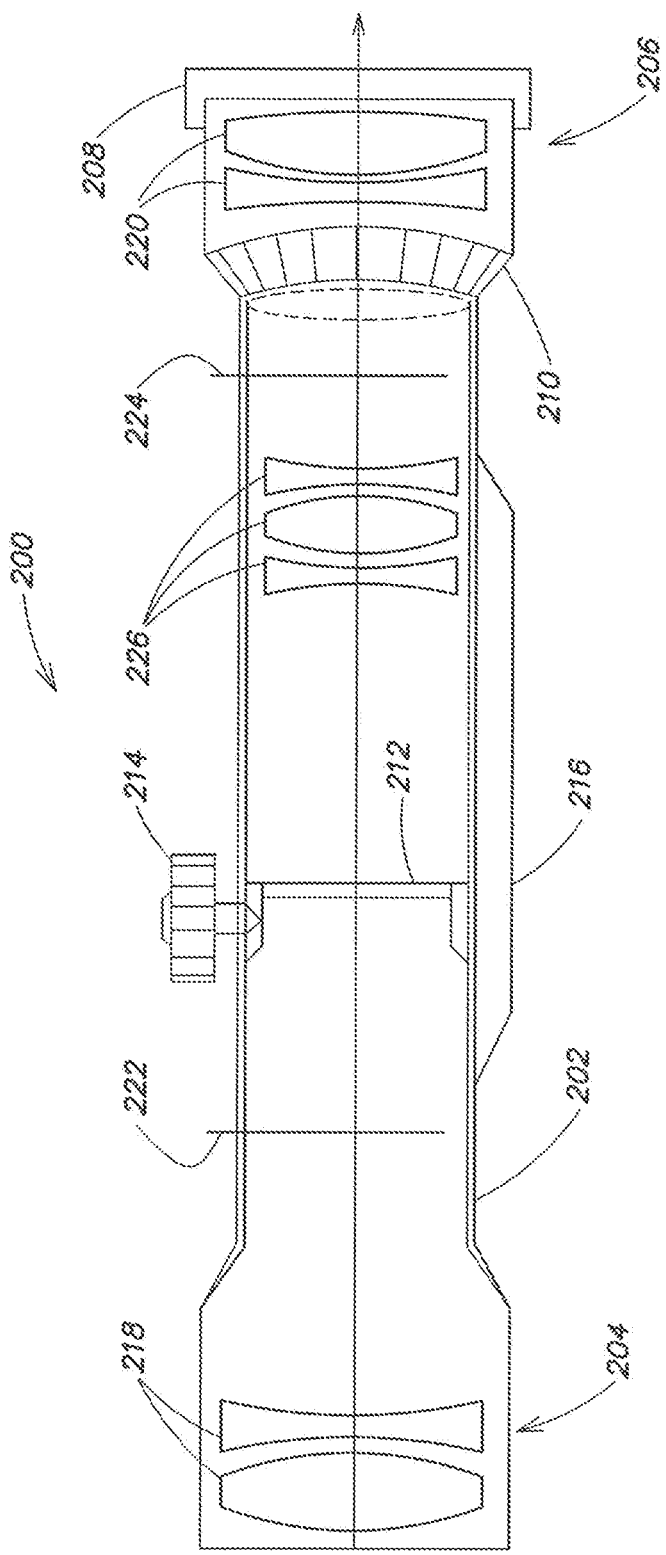
FIG. 2 is a partial side section of a magnification zoom sighting system according to an embodiment of the invention.

Referring now to FIG. 2, an example embodiment of a magnification zoom sighting system according to the present disclosure is illustrated. Magnification zoom sighting system 200 includes an elongated tube housing 202 having an objective end 204 and a distal ocular end 206. Magnification zoom sighting system 200 includes an objective lens group 218 mounted at the objective end 204 in a manner that faces the target, and an ocular lens group 220 mounted at the ocular end 206 in a manner that faces the operator. The objective lens group 218 collects rays coming from the target and focuses them at the first focal plane 222 to create an image of the target. In varying embodiments, the objective lens group 218 may include a plurality of lenses. For example, objective lens group 218 may include a primary objective lens and a field lens to aid in gathering light at the first focal plane 222.

The zoom lens element 226 is located between the objective lens group 218 and the ocular lens group 220. As discussed herein, the zoom lens element 226 reorients the image in the second image plane 224 such that the image corresponds to the target, i.e., top and bottom of the image are exactly as the eye perceives the top and bottom of the target. The ocular lens group 218 and the eyepiece 208 enable the operator to view the reoriented image of the target at the second image plane 224. In varying embodiments, the zoom lens element 226 may include one or more moveable optical elements. For example, the zoom lens element 226 may include a magnification lens or a focus lens to visually magnify or focus the image at the second image plane 226. Zoom lens element 226 may further include any electro-optical, electro-mechanical, or mechanical system to manipulate one or more optical elements (e.g., a magnification lens) in the zoom lens element 226. Alternatively, zoom lens element 226 may be coupled to a processor that controls the zoom lens element 226 to manipulate one or more optical elements.

In the example embodiment, the zoom lens element 226 further includes a magnification adjustment mechanism 210 having an optical magnification setting for adjusting the optical magnification of the image. For example, the magnification adjustment mechanism 210 can include an engraved ring rotatably fixed about the exterior of the elongated tube housing 202. Manual rotation of the magnification adjustment mechanism 210 in a first direction drives a magnification lens in zoom lens element 226 increasing the perceived size of the target. Manual rotation of the magnification adjustment mechanism 210 in the opposite direction retracts the magnification lens and decreases the perceived size of the target. In various embodiments, the optical magnification settings of the magnification adjustment mechanism 210 include increments of 6×, 8×, 10×, 12×, 15×, and 20× magnification. In other embodiments, the optical magnification settings of the magnification adjustment mechanism 210 include a range of 5× to 20× magnification. It is noted that examples of specific implementations are provided here for illustrative purposes only and are not intended to be limiting. The zoom lens element 226 can include any mechanism known in the art of magnification adjustment for varying the optical magnification of the zoom lens element 226 including, for example, electro-optical, electro-mechanical, or mechanical controllers to manipulate one or more optical elements (e.g., a magnification lens) in the zoom lens element 226. Zooms lens element 226 may also be coupled to a processor that determines an optical magnification setting and controls the zoom lens element 226 to provide an optical magnification.

In the example embodiment, the magnification zoom sighting system 200 further includes a reticle 212 disposed proximate the first image plane 222 such that it is viewable through the ocular lens group 220 and eyepiece 208 and superimposed upon the image. Reticle 212 can include cross-hairs, circles, horseshoes, dots, or any other shape suited to assist the operator in aiming the associated weapon. In various embodiments, the reticle 212 is mobile and controllable through adjustment dials (e.g., adjustment dial 214) located on the exterior of elongated tube housing 202. For example, magnification zoom sighting system 200 may have a top mounted elevation adjustment dial coupled with reticle 212 that enables vertical reticle movement to compensate for elevation discrepancies between the operator and the target. In a further example, reticle 212 is coupled with a side mounted wind adjustment dial to compensate for effects of wind on projectile accuracy.

Figure 3:
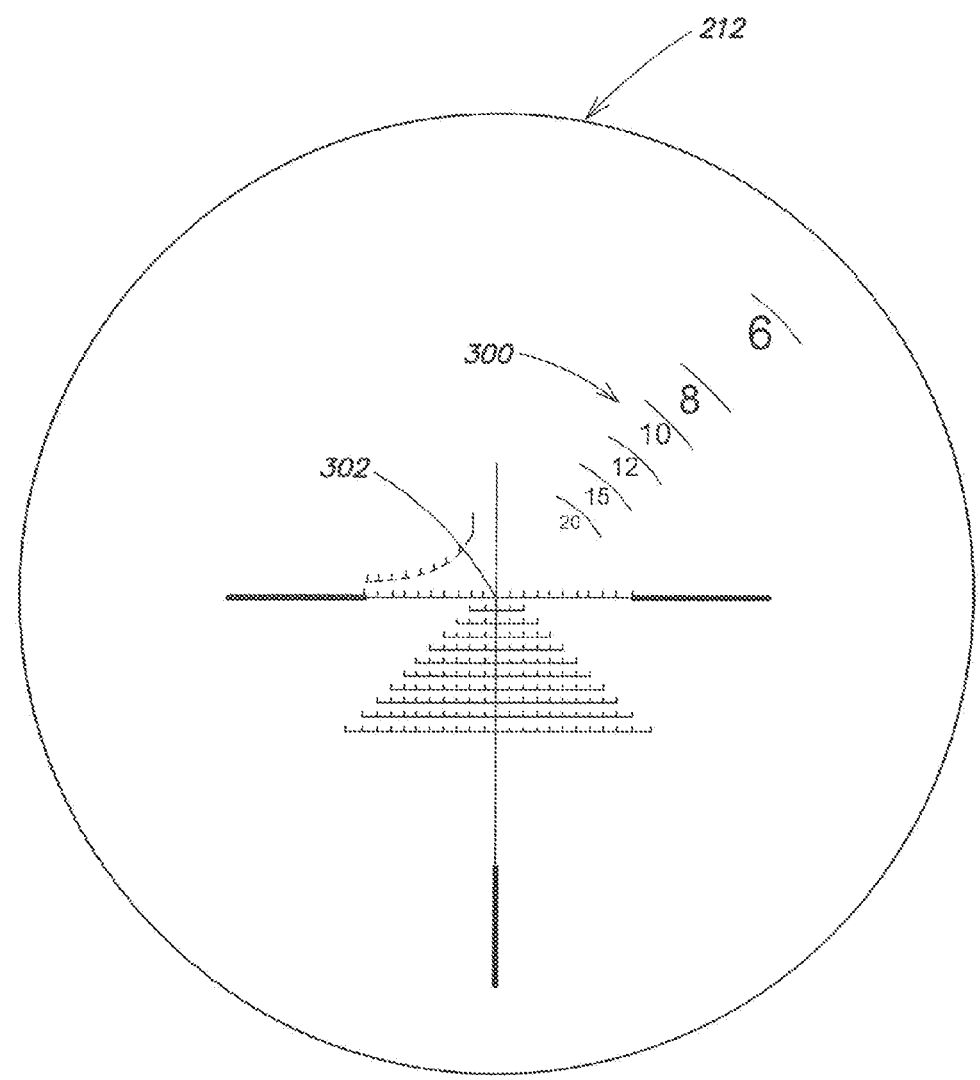
FIG. 3 illustrates a reticle viewed through the magnification zoom sighting system of FIG. 2 at a low optical magnification setting.

Referring now to FIG. 3, with continuing reference to FIG. 2, in various embodiments, the reticle 212 further includes magnification indicia 300 that conveys the optical magnification setting of the magnification adjustment mechanism 210. For example, the reticle 212 can convey 12× to the operator of the magnification zoom sighting system 200 when the corresponding optical magnification setting of the magnification adjustment mechanism 210 is 12×. FIG. 3 shows an example embodiment wherein the magnification indicia 300 includes a series of concentric arcs in the upper right quadrant of the field of view of the ocular lens group 220 and the eyepiece 208. In FIG. 3, the concentric arcs originate from a central aiming mark 302. Corresponding to each concentric arc is a numeric indicator that conveys the optical magnification setting of the magnification adjustment mechanism 210. In further embodiments, the magnification indicia 300 can include a series of hash marks, a series of lines, or a series of angles, and be disposed in an upper left, a lower left, a lower right, or any central quadrant within the field of view. The reticle 212 may also include a series of indicators relating to the estimation of wind speed, target speed, target size, distance, projection, or ballistic correction. As the operator activates the magnification adjustment mechanism 210 (e.g., rotates the engraved ring) to increase the magnification of the magnification zoom sighting system 200, the target and the reticle 212 expand within the field of view of the operator. As the reticle 212 expands, the magnification indicia 300 expand and disappear from the field of view. A magnification indicium expanded to the edge of the field of view indicates the current magnification setting of the magnification adjustment mechanism 210.

Figure 4:
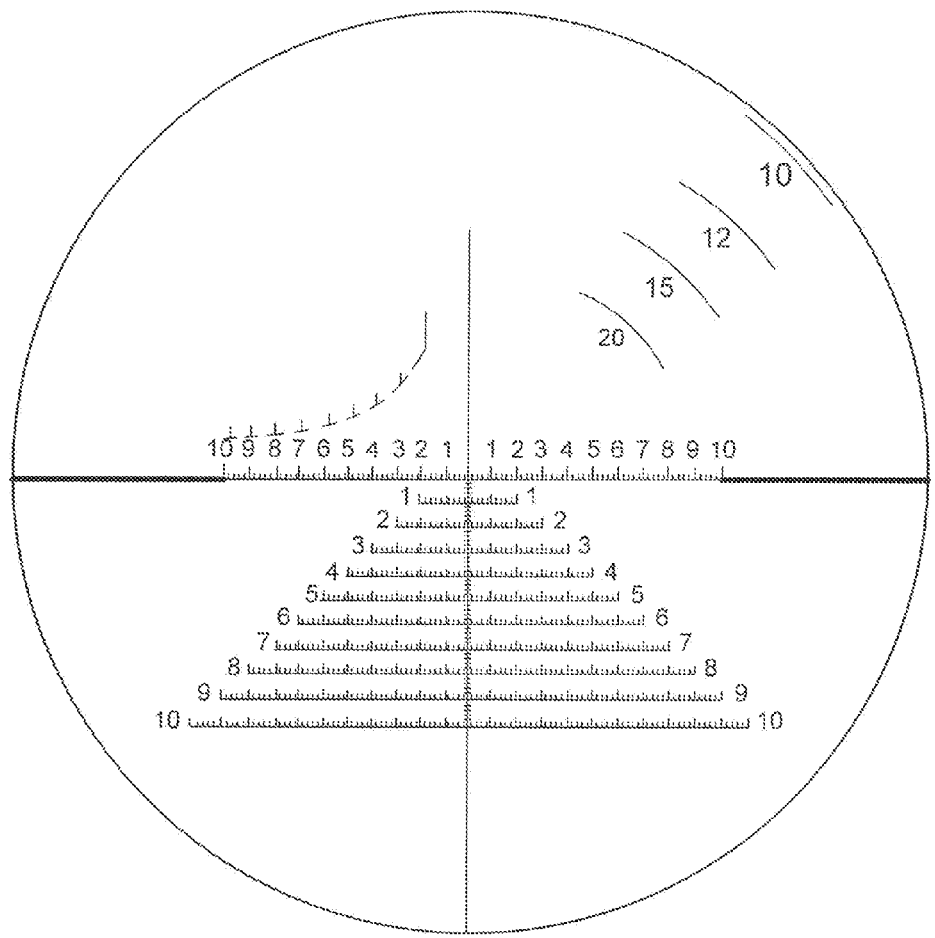
FIG. 4 illustrates a reticle viewed through the magnification zoom sighting system of FIG. 2 at a moderate optical magnification setting.
Figure 5:
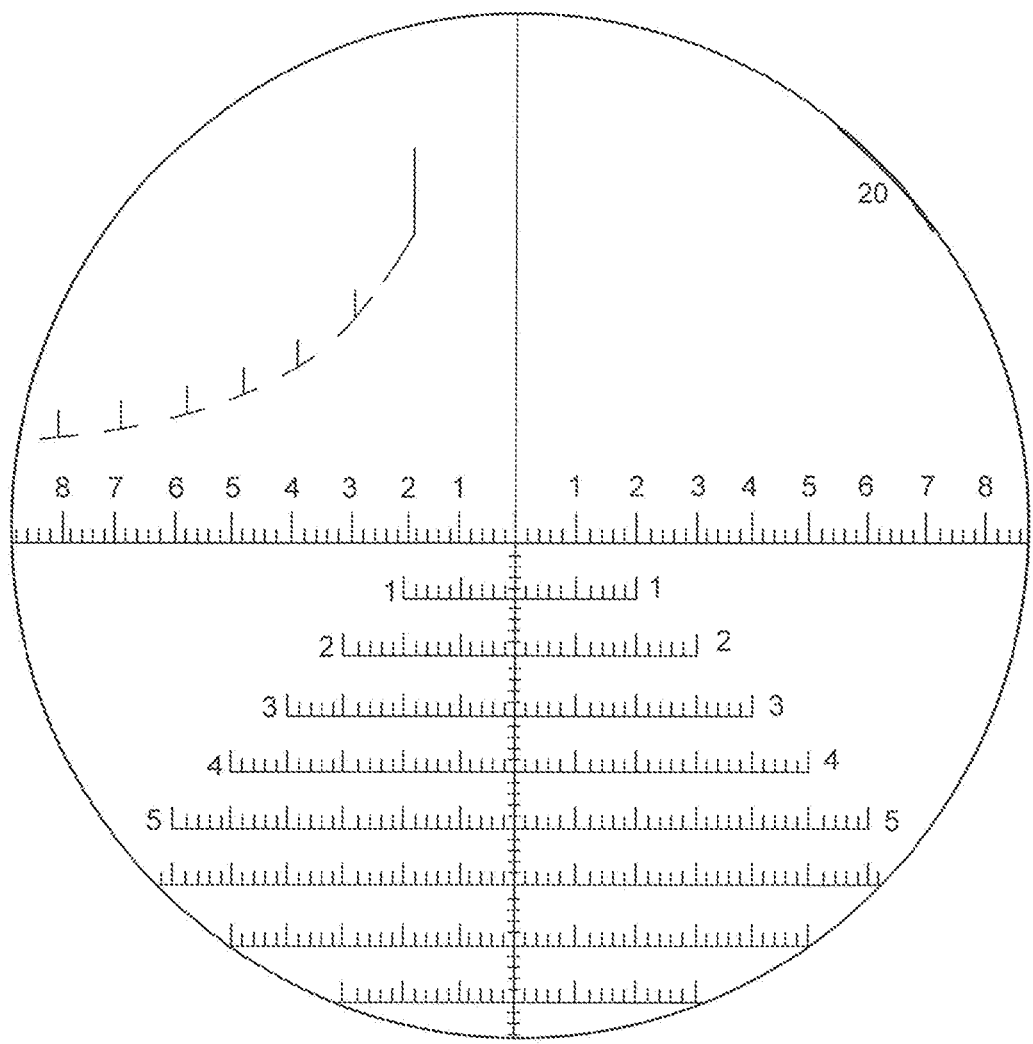
FIG. 5 illustrates a reticle viewed through the magnification zoom sighting system of FIG. 2 at a high optical magnification setting.

For example, FIG. 4 illustrates a reticle 212 during a magnification setting of 10×. Similarly, FIG. 5 illustrates a reticle 212 during a magnification setting of 20×. As the magnification of the magnification zoom sighting system 200 is increased, the magnification indicium for 6×, 8×, 10×, 12×, 15×, and any other magnifications, disappears from view. As a result, the operator sees the reticle 212 with the magnification indicium for 20× on the edge of his or her field of view. This indicates that the current magnification setting is 20×.

In various further embodiments, a reticle 212 having magnification indicia 300, as described herein, may be used in binoculars, spotting scopes and other optical sighting devices. In particular, such devices may include devices used by a spotter of a rifle team to assist a shooter in aiming a weapon.

The magnification zoom sighting system 200 may further include a mounting system 216. The mounting system 216 may include an orientation mechanism that allows for adjustment of the magnification zoom sighting system 200 relative to the matter on which it is mounted. The orientation mechanism may be used to "level" or adjust the magnification zoom sighting system 200 as necessary to correct orientation or the field of view of the system.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A magnification zoom sighting system, comprising:
   an objective lens group that produces an image of a distant object at a first focal plane;
   a zoom lens element that relays the image from the first focal plane to a second focal plane and varies an optical magnification of the image;
   an ocular lens group for viewing the image at the second focal plane;
   a magnification adjustment mechanism coupled to the zoom lens element for adjusting an optical magnification setting of the zoom lens element to adjust the optical magnification of the image; and
   a reticle having magnification indicia comprising a series of concentric arcs, disposed proximate the first focal plane such that the indicia are configured to be viewable through the ocular lens group in a field of view thereof and superimposed upon the image, wherein the magnification indicia convey the optical magnification setting of the zoom lens element and are configured to change in size and scale with a change in the optical magnification setting.

2. The magnification zoom sighting system of claim 1, wherein the series of concentric arcs are disposed in an upper right quadrant of the field of view.

3. The magnification zoom sighting system of claim 2, wherein the reticle further includes an aiming mark from which the series of concentric arcs originate.

4. The magnification zoom sighting system of claim 3, wherein the aiming mark includes crosshairs having a series of indicators relating to one of a group of estimation of wind speed, target speed, target size, distance, projection, and ballistic correction.

5. The magnification zoom sighting system of claim 1, wherein the magnification adjustment mechanism comprises a rotatable ring.

6. A magnification zoom sighting system, comprising:
   an elongated tube having an ocular end and a distal objective end;
   an objective lens group mounted at the objective end of the elongated tube that produces an image of a distant object;
   an ocular lens group having an eyepiece mounted at the ocular end of the elongated tube for viewing the image within the field of view thereof;
   a zoom lens element including a magnification adjustment mechanism having an optical magnification setting for adjusting optical magnification of the image, interposed between the objective lens group and the ocular lens group; and
   a reticle having magnification indicia comprising a series of concentric arcs that convey the optical magnification setting, interposed between the objective lens group and the zoom lens element, wherein the magnification indicia are configured to be superimposed upon the image and to change in size and scale with a change in the optical magnification setting.

7. The magnification zoom sighting system of claim 6, wherein the series of concentric arcs are disposed in an upper right quadrant of the field of view.

8. The magnification zoom sighting system of claim 7, wherein the reticle further includes an aiming mark from which the series of concentric arcs originate.

9. The magnification zoom sighting system of claim 8, wherein the aiming mark includes crosshairs having a series of indicators relating to one of a group of estimation of wind speed, target speed, target size, distance, projection, and ballistic correction.

10. The magnification zoom sighting system of claim 6, wherein the magnification adjustment mechanism comprises a rotatable ring.

11. A magnification system for viewing a distant object, comprising:
   an objective lens group that produces an image of the distant object at a first focal plane;

a zoom lens element that relays the image from the first focal plane to a second focal plane and varies an optical magnification of the image;

an ocular lens group for viewing the image at the second focal plane;

a magnification adjustment mechanism coupled to the zoom lens element for adjusting an optical magnification setting of the zoom lens element to adjust the optical magnification of the image; and means for displaying magnification indicia comprising a series of concentric arcs viewable through the ocular lens group in a field of view thereof and superimposed upon the image, the magnification indicia conveying the optical magnification setting of the zoom lens element, wherein the magnification indicia are configured to change in size and scale with a change in the optical magnification setting.

12. The magnification system of claim 11, wherein the series of concentric arcs are disposed in an upper right quadrant of the field of view.

13. The magnification system of claim 12, wherein the reticle further includes an aiming mark from which the series of concentric arcs linearly originate.

\* \* \* \* \*